United States Patent
Griffin et al.

(10) Patent No.: US 12,236,283 B2
(45) Date of Patent: Feb. 25, 2025

(54) TRANSMITTING CONFIGURATION DATA BETWEEN CONTAINERS RUNNING ON DIFFERENT COMPUTER ARCHITECTURES VIA A SIDECAR CONTAINER

(71) Applicant: RED HAT, INC., Raleigh, NC (US)

(72) Inventors: Leigh Griffin, Waterford (IE); Pierre-Yves Chibon, Paris (FR)

(73) Assignee: Red Hat, Inc., Raleigh, NC (US)

( * ) Notice: Subject to any disclaimer, the term of this patent is extended or adjusted under 35 U.S.C. 154(b) by 464 days.

(21) Appl. No.: 17/750,717

(22) Filed: May 23, 2022

(65) Prior Publication Data

US 2023/0376360 A1    Nov. 23, 2023

(51) Int. Cl.
*G06F 9/455*    (2018.01)
*G06F 9/52*    (2006.01)

(52) U.S. Cl.
CPC ..................... *G06F 9/52* (2013.01)

(58) Field of Classification Search
CPC ........................................................ G06F 9/52
See application file for complete search history.

(56) References Cited

U.S. PATENT DOCUMENTS

| | | |
|---|---|---|
| 11,249,856 B2 | 2/2022 | Natanzon et al. |
| 2019/0294779 A1 | 9/2019 | Suneja et al. |
| 2022/0060398 A1 | 2/2022 | Shishir et al. |

FOREIGN PATENT DOCUMENTS

| | | |
|---|---|---|
| CN | 111831362 A | 10/2020 |
| CN | 112596762 A | 4/2021 |
| CN | 113296805 A | 8/2021 |
| CN | 113986371 A | 1/2022 |

OTHER PUBLICATIONS

Mikkelsen, et al., "Immutable Infrastructure Calls for Immutable Architecture: Deploying a Changeless Architecture in the Cloud", Proceedings of the 52nd Hawaii International Conference on System Sciences, 2019, pp. 7058-7066.

*Primary Examiner* — Gregory A Kessler
(74) *Attorney, Agent, or Firm* — Kilpatrick Townsend & Stockton LLP

(57) ABSTRACT

A system can instantiate a first container and a sidecar container on a first node. The system can transmit configuration data from the first container to the sidecar container. The system can then initiate a migration of the sidecar container from the first node to a second node, where the second node has a different computer architecture than the first node. The second node can provide the configuration data from the sidecar container to a second container, for example after the migration is complete.

20 Claims, 4 Drawing Sheets

TRANSMITTING CONFIGURATION DATA BETWEEN CONTAINERS RUNNING ON DIFFERENT COMPUTER ARCHITECTURES VIA A SIDECAR CONTAINER

TECHNICAL FIELD

The present disclosure relates generally to configuring containers in a computing environment. More specifically, but not by way of limitation, this disclosure relates to transmitting configuration data between containers running on different computer architectures by using a sidecar container.

BACKGROUND

A distributed computing environment may include computing resources distributed among one or more nodes. In some cases, the nodes may be running on different computer architectures. For instance, one node may be running on an x64 architecture and another node may be executing on an x86_64 architecture. Each node may include one or more containers. A container is a relatively isolated virtual environment that can be generated by leveraging the resource isolation features (e.g., cgroups and namespaces) of a Linux Kernel. Containers are generally deployed from an image file and can package an entire runtime environment for a software application (e.g., the application plus its dependencies, libraries and other binaries, and an operating system). Each container may be allocated computing resources of its corresponding node with which to execute processes.

DETAILED DESCRIPTION

Figure 1:
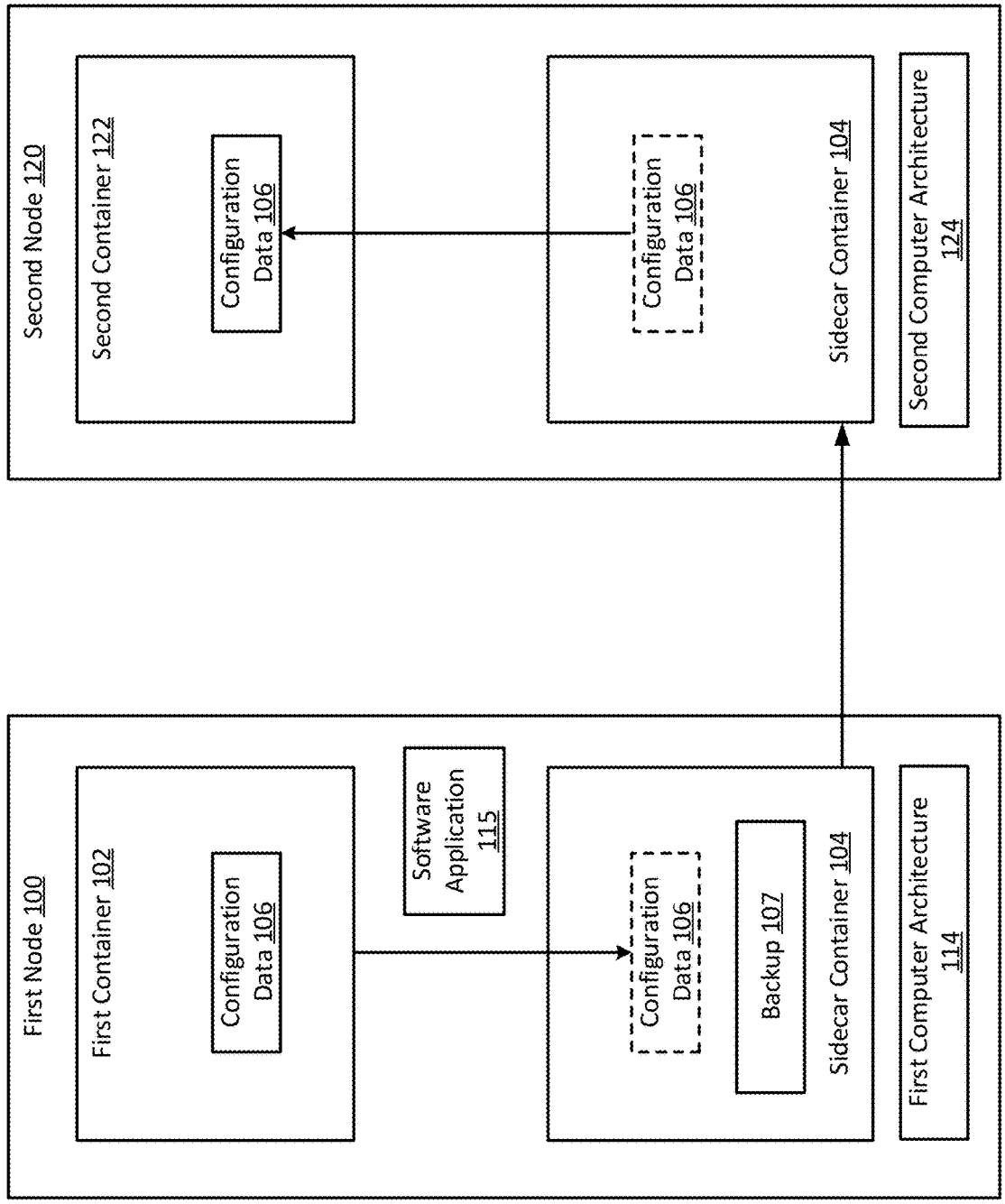
FIG. 1 is a block diagram of an example of a system that can transmit configuration data between containers running on different computer architectures via a sidecar container according to some aspects of the present disclosure.

A distributed computing environment may include a first container executing on a first node and a second container executing on a second node. The first node may include a first computer architecture and the second node may include a second computer architecture. During a development process, changes may be made to the first container that may not be reflected in the second container. The development process may include adding a software package to the first container that may not be included in the second container. Alternatively, the development process may include removing a software package from the first container that may be included in the second container. It may be desirable to propagate the changes from the first container to the second container. But certain security protocols may prevent communication among the first node and the second node due to the mismatching computer architectures. This can be problematic because it can prevent the changes in the first container from being propagated to the second container. Additionally, modifications made during a development process may result in differences between a first runtime environment inside the first container and a second runtime environment inside the second container. For example, the first runtime environment may include a first set of dependencies and the second runtime environment may include a second set of dependencies. It may be desirable to synchronize the first runtime environment and the second runtime environment (e.g., so that they have the same dependencies for use in deploying the same or similar software), but the different computer architectures on the first node and the second node may make it challenging to do so.

Some examples of the present disclosure can overcome one or more of the abovementioned problems by using a sidecar container as a mechanism to transfer configuration data from the first container on the first node to the second container on the second node, thereby allowing the configuration data to be shared between the two containers. A sidecar container may be a container that is used for auxiliary tasks related to primary containers. Sidecar containers may be lightweight and may not consume many computing resources. By using the sidecar container to share configuration data, it may help resolve differences in the runtime environments of the two containers and assist in synchronizing the two containers with one another, particularly in situations where the configuration data cannot be easily transferred from the first node to the second node using conventional approaches (e.g., due to their different computer architectures).

As one example, a software application can be executing on the first node. The software application can receive a notification indicating that modifications have been made to a configuration of the first container running on the first node. In response to receiving the notification, the software application can instantiate a sidecar container on the first node. The sidecar container may be a secondary container. The software application can then issue a command to cause the first container to export its configuration data to the sidecar container. The configuration data may be stored in one or more configuration files, such as JSON files or any other suitable configuration file. After the configuration data has been exported to the sidecar container, the software application can cause the sidecar container to be migrated to the second node, on which the second container is running. Migrating the sidecar container to the second node may be possible in situations where other conventional ways of transmitting configuration data between two nodes may be limited or prevented, for example due to security restrictions.

Once the sidecar container has been migrated to the second node, the second node can extract the configuration data from the sidecar container and begin a rebuild process in relation to the second container running on the second node. The rebuilding process can involve building the image file for the second container again using some new or modified information, such as the configuration data. In some examples, the rebuild process may also involve shutting down the running second container and redeploying it using the rebuilt image file. In other examples, the rebuild process may occur during a runtime of the second container, without the second container having to be shut down. Either way, the second container can be reconfigured using the configuration data via the rebuild process. Using these techniques, the configuration of the second container can be quickly and easily synchronized with the configuration of the first container.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system that can transmit configuration data between containers running on different computer architectures via a sidecar container according to some aspects of the present disclosure. The system may include a first node 100 and a second node 120. The first node 100 and the second node 120 may be part of a distributed computing environment. The first node 100 and the second node 120 may be physical hardware devices (e.g., desktop computers, servers, laptop computers, etc.) that each have a quantity of computing resources allocated to them in the distributed computing environment.

The first node 100 may include a first container 102, and the second node 120 may include a second container 122. The first node 100 may include a first computer architecture 114, and the second node 120 may include a second computer architecture 124 that is different from the first computer architecture 114. Examples of computer architectures may include x32, x64, ARM, ARM64, and AArch64. The first container 102 may execute on top of the first computer architecture 114, which may have a host operating system that is the same as or different from a guest operating system of the first container 102. Similarly, the second container 122 may execute on top of the second computer architecture 124, which may have a host operating system that is the same as or different from a guest operating system of the second container 122. Certain security protocols may prevent the first container 102 from transmitting (e.g., directly or via an established communication pathway) configuration data 106 to the second container 122 due to a mismatch between the first computer architecture 114 and the second computer architecture 123. For example, a port used by the first node 100 to transmit data to the second node 120 may be filtered or blocked (e.g., by a firewall or another networking device), thereby preventing the first container 102 from easily communicating with the second container 122.

To help navigate around the abovementioned security restrictions, in some examples the first node 100 may include a software application 115. The software application 115 may include an exporter sidecar service. The software application 115 can detect an event indicating that configuration data 106 is to be transferred from the first container 102 to the second container 122. Examples of events may include receipt of a request (from a user or another software program), a configuration change to the first container 102, passage of a time period, etc. The configuration data 106 may be stored in one or more configuration files, such as JSON or YAML files. The configuration data 106 can include setting values and other information characterizing the runtime environment of the first container 102. In response to detecting the event, the software application 115 may instantiate a sidecar container 104 on the first node 100. For example, the software application 115 may issue a command for causing the sidecar container 104 to be instantiated on the first node 100. The sidecar container 104 may be different from the first container 102 and the second container 122. For example, the first container 102 and the second container 122 may be primary containers. The sidecar container 104 may be a secondary container, such as sidecar container corresponding to a sidecar pattern. It will be appreciated that although some examples are described herein with reference to a sidecar container, any suitable type of container may be used to perform the functions described herein with respect to the sidecar container.

Once the sidecar container 104 has been instantiated, the software application 115 can initiate a process for copying the configuration data 106 from the first container 102 to the sidecar container 104. For example, the software application 115 may transmit a command for causing the first container 102 to export the configuration data 106 to the sidecar container 104. The configuration data 106 can be exported to the sidecar container 104 during the runtime of the first container 102 and the sidecar container 104. The software application 115 may monitor the transfer of the configuration data 106 to the sidecar container 104 and detect when the process is complete.

After the configuration data 106 has been stored in the sidecar container 104, the software application 115 can initiate a migration of the sidecar container 104 to the second node 120. The migration may involve retrieving data from a first instance of the sidecar container 104 while it is running on the first node 100, and using the data to instantiate a second instance of the sidecar container 104 on the second node 120. The migration may involve shutting down the first instance of the sidecar container 104 once the second instance of the sidecar container 104 is running. Security restrictions that may prevent communication among the first node 100 and the second node 120 may not prevent the migration, as the sidecar container 104 may be subject to an exception to the security restrictions. In some examples, the sidecar container 104 or the data therein may be encrypted before it is transmitted to the second node 120.

With the migration process complete, the sidecar container 104 may now be running on the second node 120. The second node 120 can then transmit the configuration data 106 from the sidecar container 104 to the second container 122, or otherwise use the configuration data 106 in the sidecar container 104 to reconfigure the second container 122. In some examples, the second node 120 can initiate a rebuild of the second container 122 using the configuration data 106. The rebuild process may involve using the configuration data 106 to update a configuration of the second container 122 (e.g., during the runtime of the second container 122). In some examples, the rebuild process can include updating dependencies related to the second container 122. For example, the rebuild process may include updating OS-level dependencies, such as a version of a programing language that can be used by an operating system that may execute on the second container 122. The rebuild process may also include installing a software package for use by the second container 122. After the rebuild process is complete, the second node 120 may shut down or destroy the sidecar container 104.

In some examples, the sidecar container 104 may be used to store backups of the first container 102 or the second container 122, additionally or alternatively to being used to transfer configuration data 106 between the two containers 102, 122. For example, the first node 100 can store a backup 107 of the first container 102 in the sidecar container 104 when it is running on the first node 100. As another example, the second node 120 can store a backup 107 of the second container 122 in the sidecar container 104 when it is running on the second node 120. The backup 107 can include data contained in the first container 102 or second container 122, respectively. The backup 107 may be automatically and periodically generated from contents of the first container 102 or the second container 122, for example in response to certain events, and stored in the sidecar container 104. Thereafter, the first node 100 or the second node 120 may be redeployed or reconfigured using the backup 107 from the sidecar container 104.

In some examples, the sidecar container 104 may be promoted to a primary status on the second node 120 and the second container 122 may be shut down, for example rather than rebuilding the second container 122 using the configuration data 106. Because the sidecar container 104 already includes the configuration data 106, the sidecar container 104 can serve as a properly configured replacement for the second container 122. The sidecar container 104 may include processes or services in addition to the configuration data 106, which may allow the second node 120 to seamlessly transition from executing processes (e.g., services) in the second container 122 to executing processes in the sidecar container 104.

Figure 2:
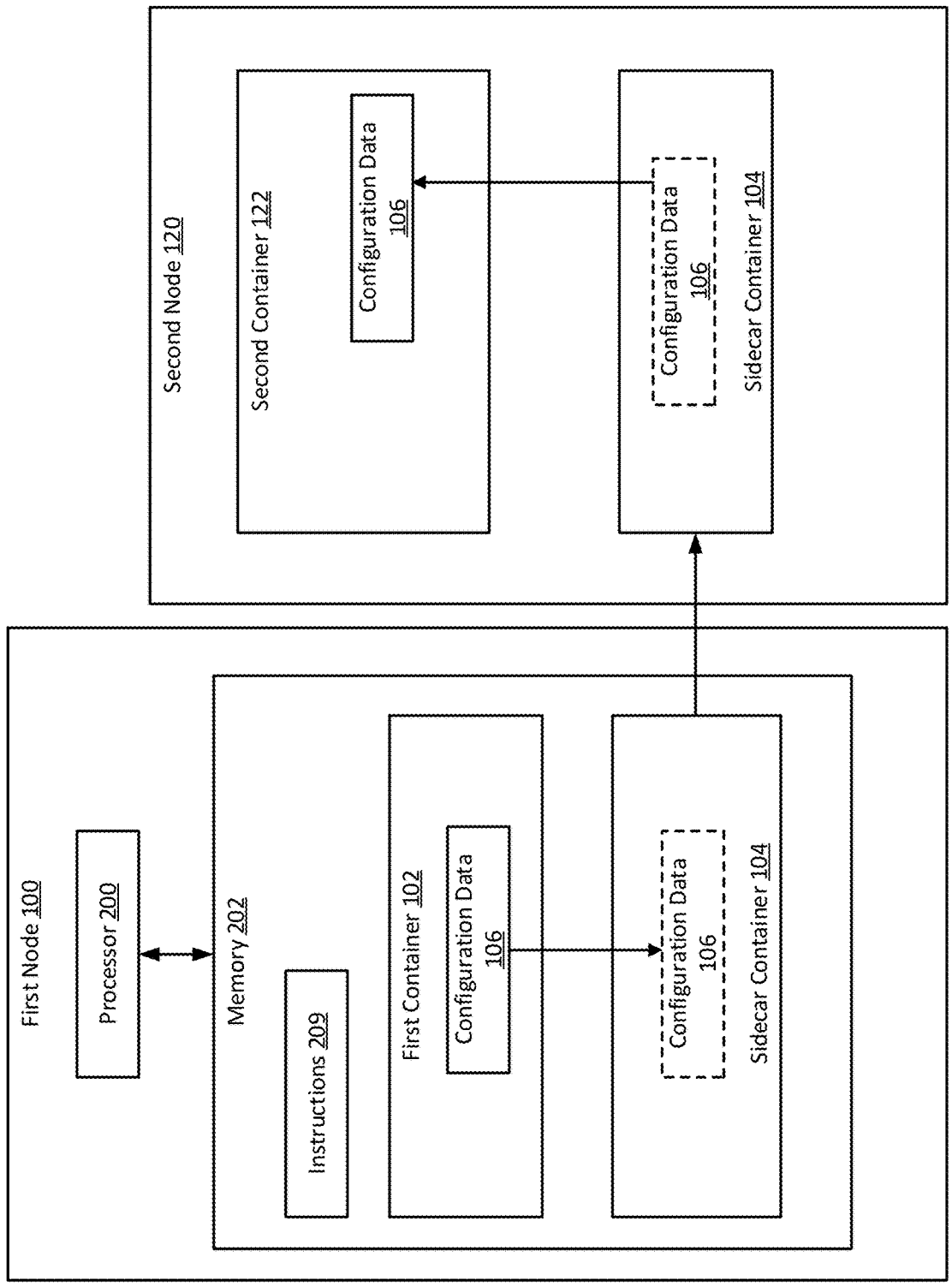
FIG. 2 is a block diagram of an example of a system that can transmit configuration data between containers running on different computer architectures via a sidecar container according to some aspects of the present disclosure.

FIG. 2 is a block diagram of an example of a system that can transmit configuration data between containers running on different computer architectures via a sidecar container according to some aspects of the present disclosure. The system can include a first node 100 and a second node 120, as mentioned above. The first node 100 can include a processor 200 that is communicatively coupled to a memory 202. The processor 200 and memory 202 may be integrated into a single housing or may be distributed from one another.

The processor 200 can include one processor or multiple processors. Non-limiting examples of the processor 200 include a Field-Programmable Gate Array (FPGA), an application-specific integrated circuit (ASIC), a microprocessor, etc. The processor 200 can execute instructions 209 stored in the memory 202 to perform one or more operations. In some examples, the instructions 209 can include processor-specific instructions generated by a compiler or an interpreter from code written in any suitable computer-programming language, such as C, C++, C#, etc.

The memory 202 can include one memory device or multiple memory devices. The memory 202 can be volatile or non-volatile, in that the memory 202 can retain stored information when powered off. Non-limiting examples of the memory 202 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 200 with the instructions 209 or other program code. Non-limiting examples of a non-transitory computer-readable medium include magnetic disks, memory chips, ROM, random-access memory (RAM), an ASIC, a configured processor, optical storage, or any other medium from which a computer processor can read the instructions 209.

The first node 100 and the second node 120 may be part of a distributed computing environment. The first node may include a first container 102, and the second node 120 may include a second container 122. The first node 100 may include a have a different computer architecture than the second node 120. Certain security protocols may prevent the first container 102 from transmitting configuration data 106 to the second container 122 due to a mismatch between the different computer architectures.

In some examples, the processor 204 can provide configuration data 106 from the first container 102 to the second container 122. The processor 204 can provide the configuration data 106 from the first container 102 to the second container 122 in response to a request. The processor 204 can also instantiate the sidecar container 104 on the first node 100, for example in response to the request. The processor 204 can then transmit the configuration data 106 to the sidecar container 104. The processor 204 can then migrate the sidecar container from the first node 100 to the second node 120. The second node 120 may be configured to provide the configuration data 106 from the sidecar container 104 to the second container 122 (e.g., once the migration is complete).

Figure 3:
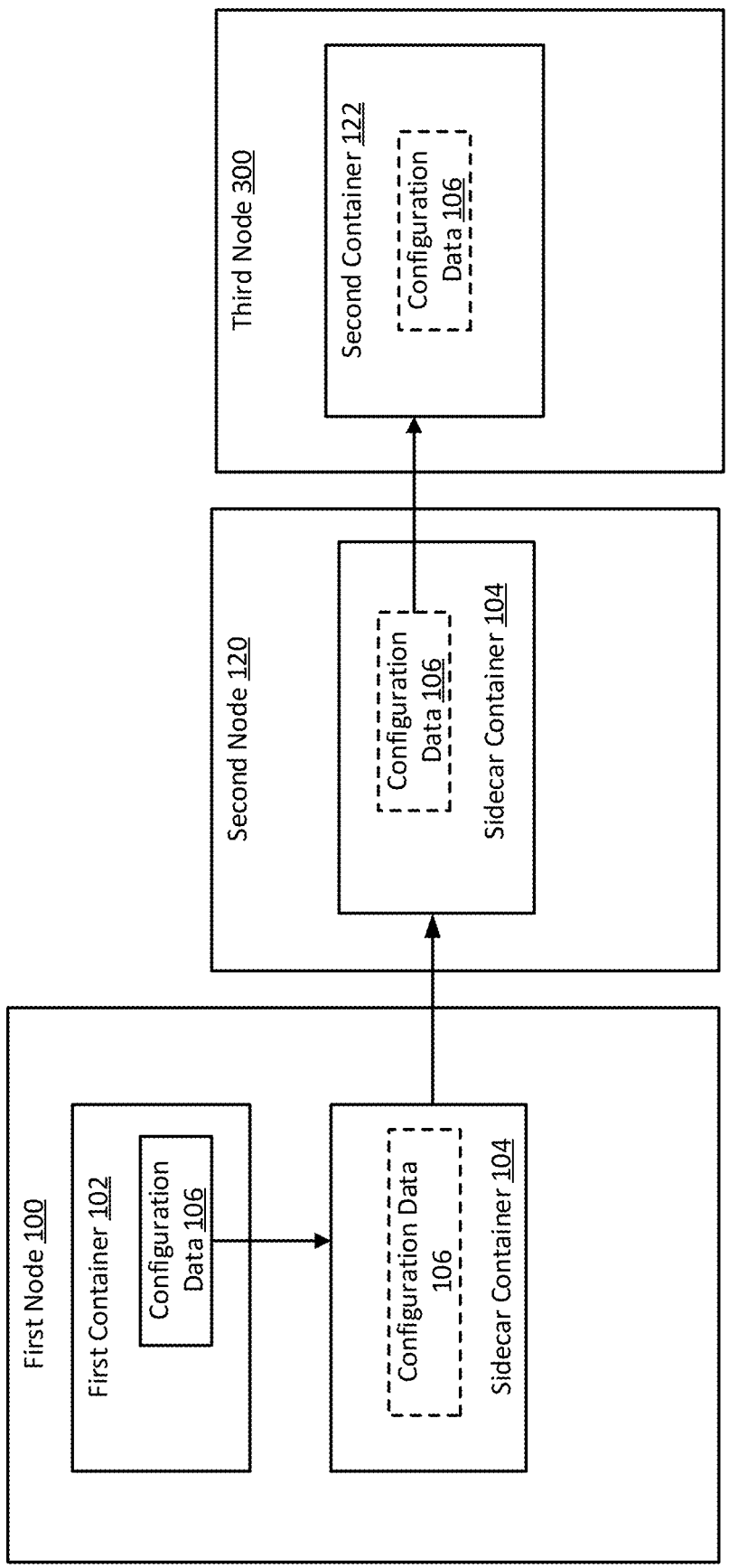
FIG. 3 is a block diagram of an example of a system that can transmit configuration data between containers running on different computer architectures via a sidecar container according to some aspects of the present disclosure.

FIG. 3 is a block diagram of an example of a system that can transmit configuration data between containers running on different computer architectures via a sidecar container according to some aspects of the present disclosure. The system can include a first node 100 and a second node 120, as mentioned above. The first node 100 may have a different computer architecture from the second node 120, and the second node 120 may have the same computer architecture as a third node 300.

The first node 100, second node 120, and third node 300 may be parts of a distributed computing environment. For example, the first node 100 may be a first server, the second node 120 may be a second server, and the third node 300 may be a third server. Alternatively, the first node 100 may be part of a first distributed computing environment, and the second node 120 and third node 300 may be part of a second distributed computing environment. The first distributed computing environment and the second distributed computing environment may require their respective nodes to run on different computer architectures.

Certain security protocols may prevent the first container 102 from transmitting (e.g., directly or via an established communication pathway) configuration data 106 to the second node 120 due to a mismatch between their different computer architectures. The first container 102 may also be unable to transmit the configuration data 106 to the third node 300 based on the security protocols or for other reasons. But, the security protocols may allow the second node 120 to transmit the configuration data 106 to the third node 300, which may need the configuration data 106 (e.g., to synchronize the first container 102 with the second container 122 thereon). So in some examples, the first node 100 can provide the configuration data 106 to the second node 120 via the sidecar container 104, at which point the second node 120 can transmit the configuration data 106 to the third node 300 using means other than the sidecar container 104. Through this daisy chain, the first node 100 can supply the third node 300 with the configuration data 106.

The second container 122 may be present on the third node 300. The second container 122 may be configured based on the configuration data 106 received from the second node 120. The configuration data 106 may be stored in one or more configuration files, such as JSON or YAML files. The configuration data 106 can include setting values and other information characterizing the runtime environment of the first container 102. The configuration data 106 can include values for environment variables that can modify the second container 122. In some examples, the environment variables may include an amount of computing resources to allocate to the second container 122, a range of ports that the second container 122 may use, driver options for the second container 122, a memory limit for the second container, or a namespace for the second container 122.

As noted above, the first node 100 can initiate an indirect transfer of the configuration data 106 to the third node 300.

For example, the first node 100 may instantiate a sidecar container 104. The sidecar container 104 may be a secondary container. The first node 100 can transmit the configuration data 106 to the sidecar container 104. The first node 100 can then initiate a migration of the sidecar container 104 to the second node 120. The second node 120 can extract the configuration data 106 from the sidecar container 104 and transmit the configuration data 106 (e.g., directly) to the third node 300. The third node 300 can then receive the configuration data 106 and provide it to the second container 122, or otherwise use the configuration data 106 in relation to the second container 122. Through this process, the configuration data 106 may be indirectly supplied from the first node 100 to the third node 300 for enabling the third node 300 to reconfigure the second container 122.

Figure 4:
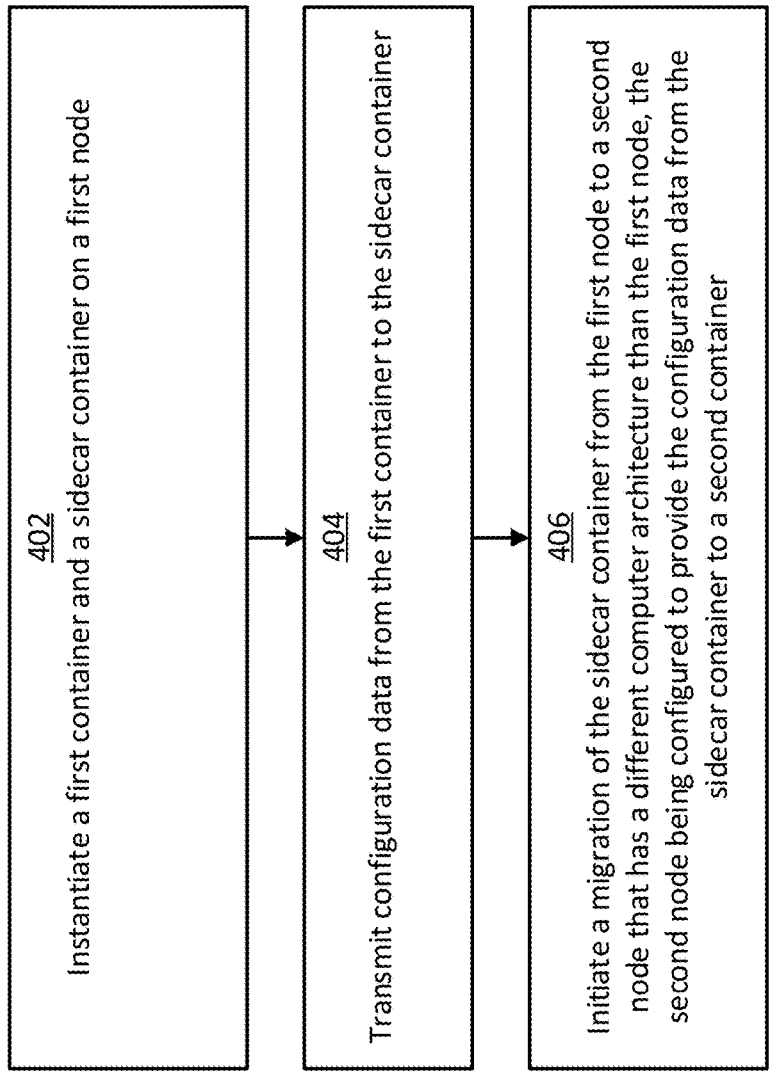
FIG. 4 is a flowchart of a process that can transmit configuration data between containers running on different computer architectures via a sidecar container according to some aspects of the present disclosure.

FIG. 4 is a flow chart of an example of a process for transmitting configuration data between containers running on different computer architectures via a sidecar container according to some aspects of the present disclosure. While FIG. 4 depicts a certain sequence of steps for illustrative purposes, other examples can involve more steps, fewer steps, different steps, or a different order of the steps than is depicted in FIG. 4. The steps of FIG. 4 are described below with reference to components of FIG. 2.

At block 402, a processor 200 instantiates a first container 102 and a sidecar container 104 on a first node 100. The second node 120 can have a second computer architecture 124 that is different from a first computer architecture 114 of the first node 100.

At block 404, the processor 200 transmits configuration data from the first container to the sidecar container 104. The configuration data 106 may be embedded in a markup file, such as a JSON file, a YAML file, an XML file, or any other suitable markup file. The configuration data 106 may correspond to a state of the first container 102.

At block 406, the processor 200 initiates a migration of the sidecar container 104 from the first node 100 to a second node 120 that has a different computer architecture than the first node. The second node 120 can provide the configuration data 106 from the sidecar container 104 to the second container 122 subsequent to a completion of the migration.

In some examples, the processor 200 may also transmit a backup 107 of the first container 102 to the sidecar container. The backup 107 may include the configuration data 106 as well as runtime data and any other data associated with the first container 102. The sidecar container 104 is different from the first container 102 and the second container 122. The first container 102 and the second container 122 may serve as primary containers, whereas the sidecar container 104 may serve as a secondary container.

In some examples, the sidecar container 104 may be promoted from a secondary status to a primary status on the second node 120. Subsequent to promoting the sidecar container 104 to a primary status, the second container 122 may be shut down, for example rather than rebuilding the second container 122 using the configuration data 106. Because the sidecar container 104 already includes the configuration data 106, the sidecar container 104 can replace the second container 122. The sidecar container 104 may include processes or services in addition to the configuration data 106, which may allow the second node 120 to seamlessly transition from executing processes (e.g., services) in the second container 122 to executing processes in the sidecar container 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising instructions executable by a processor for causing the processor to:
   instantiate a first container and a sidecar container on a first node;
   transmit configuration data from the first container to the sidecar container; and
   initiate a migration of the sidecar container from the first node to a second node that has a different computer architecture than the first node, the second node being configured to provide the configuration data from the sidecar container to a second container.

2. The non-transitory computer-readable medium of claim 1, wherein the first container and the second container are primary containers, and wherein the sidecar container is a secondary container.

3. The non-transitory computer-readable medium of claim 2, wherein the second node is configured to, subsequent to a completion of the migration:
   promote the sidecar container to primary status and shut down the second container, such that the sidecar container serves as a replacement for the second container.

4. The non-transitory computer-readable medium of claim 1, wherein the sidecar container is configured to store a backup copy of the first container or the second container.

5. The non-transitory computer-readable medium of claim 1, wherein the second node is adapted to configure the second container with the configuration data during runtime of the second container.

6. The non-transitory computer-readable medium of claim 1, wherein the second node is configured to shut down the sidecar container subsequent to transferring the configuration data to the second container.

7. The non-transitory computer-readable medium of claim 1, wherein the second node is configured to rebuild the second container based on the configuration data conveyed via the sidecar container.

8. A method comprising:
   instantiating, by a processor, a first container and a sidecar container on a first node;
   transmitting, by the processor, configuration data from the first container to the sidecar container; and
   initiating, by the processor, a migration of the sidecar container from the first node to a second node that has a different computer architecture than the first node, the second node being configured to provide the configuration data from the sidecar container to a second container.

9. The method of claim 8, wherein the first container and the second container are primary containers, and wherein the sidecar container is a secondary container.

10. The method of claim 9, wherein the second node is configured to, subsequent to a completion of the migration:
   promote the sidecar container to primary status and shut down the second container, such that the sidecar container serves as a replacement for the second container.

11. The method of claim 8, wherein the sidecar container is configured to store a backup copy of the first container or the second container.

12. The method of claim 8, wherein the second node configures the second container with the configuration data during runtime of the second container.

13. The method of claim 8, wherein the second node is configured to shut down the sidecar container subsequent to transferring the configuration data to the second container.

14. The method of claim 8, wherein the second node is configured to rebuild the second container based on the configuration data conveyed via the sidecar container.

15. A system comprising:
   a processor; and
   a memory including instructions executable by the processor for causing the processor to:
      instantiate a first container and a sidecar container on a first node;
      transmit configuration data from the first container to the sidecar container; and
      initiate a migration of the sidecar container from the first node to a second node that has a different computer architecture than the first node, the second node being configured to provide the configuration data from the sidecar container to a second container subsequent to a completion of the migration.

16. The system of claim 15, wherein the processor and memory are parts of the first node, the first node and the second node are included in a distributed computing environment, and the second node is configured to execute the second container.

17. The system of claim 15, wherein the second node is configured to rebuild the second container based on the configuration data conveyed via the sidecar container.

18. The system of claim 15, wherein the sidecar container is configured to store a backup copy of the first container or the second container.

19. The system of claim 15, wherein the second container is adapted to configure the second container with the configuration data during a runtime of the second container.

20. The system of claim 15, wherein the second node is configured to shut down the sidecar container subsequent to transferring the configuration data to the second container.

* * * * *